(12) United States Patent
Pesola et al.

(10) Patent No.: US 12,736,115 B2
(45) Date of Patent: Sep. 15, 2026

(54) ELECTRIC TRACTION AXLE/BEAM

(71) Applicant: FPT INDUSTRIAL S.P.A., Turin (IT)

(72) Inventors: Fabio Pesola, Turin (IT); Marco Tessitore, Turin (IT); Francesco Cantone, Turin (IT); Pietro Esposito, Turin (IT); Emanuele Colacito, Turin (IT); Domenico Feola, Turin (IT)

(73) Assignee: FPT INDUSTRIAL S.P.A., Turin (IT)

( * ) Notice: Subject to any disclaimer, the term of this patent is extended or adjusted under 35 U.S.C. 154(b) by 0 days.

(21) Appl. No.: 18/927,084

(22) Filed: Oct. 25, 2024

(65) Prior Publication Data

US 2025/0129837 A1 Apr. 24, 2025

(30) Foreign Application Priority Data

Oct. 20, 2023 (IT) ........................ 102023000021981

(51) Int. Cl.
*F16D 25/0638* (2006.01)
*B60K 1/00* (2006.01)
(Continued)

(52) U.S. Cl.
CPC ............. *F16H 37/082* (2013.01); *B60K 1/00* (2013.01); *B60K 17/02* (2013.01); *B60K 17/08* (2013.01);
(Continued)

(58) Field of Classification Search
CPC ..... F16H 3/62–666; F16H 2057/02034; F16H 2057/02052; F16H 57/0483; F16H 48/24;
(Continued)

(56) References Cited

U.S. PATENT DOCUMENTS 4,940,446 A * 7/1990 Inui .................... B60K 17/3462 474/144
9,637,127 B1 * 5/2017 Cooper ................ B60W 10/115
(Continued)

FOREIGN PATENT DOCUMENTS

CN 112797135 A * 5/2021 ........... B60K 17/165
DE 102016216722 A1 3/2018
(Continued)

OTHER PUBLICATIONS

Extended European Search Report in EP Application No. 24207146.2-1009, mailed Feb. 21, 2025 (5 pages).
(Continued)

*Primary Examiner* — Ernesto A Suarez
*Assistant Examiner* — Lillian T Nguyen
(74) *Attorney, Agent, or Firm* — Leason Ellis LLP

(57) ABSTRACT

Electrically driven axle, e-axle/e-beam, for a vehicle, e-axle/e-beam comprising a casing defining a space separated from the external environment and at least one electric machine and a pair of drive shafts each connected to a respective wheel of the vehicle and supported by the casing, the e-axle comprising a transmission chain housed in the space operationally connecting at least one electric machine to the pair of drive shafts, the transmission chain comprising operationally interposed in series between the at least one electric machine and the pair of drive shafts a first transfer system, a speed shift system, and a second transfer system and a differential assembly, wherein the speed shift system comprises a clutch shift system.

16 Claims, 4 Drawing Sheets

(51) Int. Cl.

| | |
|---|---|
| ***B60K 17/02*** | (2006.01) |
| ***B60K 17/08*** | (2006.01) |
| ***B60K 17/16*** | (2006.01) |
| ***F16H 37/08*** | (2006.01) |
| ***F16H 48/24*** | (2006.01) |
| ***F16H 57/02*** | (2012.01) |
| ***F16H 57/037*** | (2012.01) |
| ***F16H 57/04*** | (2010.01) |
| *B60T 1/00* | (2006.01) |

(52) U.S. Cl.

CPC ........ *B60K 17/165* (2013.01); *F16D 25/0638* (2013.01); *F16H 57/037* (2013.01); *F16H 57/0483* (2013.01); *B60K 2001/001* (2013.01); *B60T 1/005* (2013.01); *F16H 48/24* (2013.01); *F16H 2057/02034* (2013.01); *F16H 2057/02052* (2013.01)

(58) Field of Classification Search

CPC ... F16H 57/037; B60K 17/165; B60K 17/046; B60K 17/02; B60K 17/08; B60K 2001/001; F16D 13/385; F16D 25/10; F16D 25/0638

See application file for complete search history.

(56) References Cited

U.S. PATENT DOCUMENTS 11,400,803 B1 * 8/2022 Zhang ................ F16H 57/0472
2017/0074372 A1 * 3/2017 Nakajima ............ F16H 57/025
2017/0227103 A1 * 8/2017 Hughes .................. B60K 23/04
2018/0216713 A1 * 8/2018 LaForce .............. F16H 37/0813
2018/0257484 A1 * 9/2018 Yamamura ........... B60K 17/356
2020/0282827 A1 9/2020 Kaltenbach et al.
2021/0070169 A1 3/2021 Fuji
2021/0276409 A1 * 9/2021 Devreese ............... B60K 17/06
2021/0285536 A1 * 9/2021 Ketchel ............... F16H 57/0473
2022/0065334 A1 3/2022 Martin et al.
2022/0250457 A1 8/2022 Glückler et al.
2022/0250468 A1 * 8/2022 Liu ........................ B60K 17/02

FOREIGN PATENT DOCUMENTS

DE 102018124034 A1 7/2019
DE 102018116320 A1 1/2020
DE 102019112553 A1 * 11/2020
DE 102019206954 A1 * 11/2020
DE 102019133281 A1 12/2020
EP 0587389 A1 3/1994
JP 2007290656 A 11/2007
JP 2016001033 A * 1/2016

OTHER PUBLICATIONS

Italian Search Report and Written Opinion in IT Application No. 202300021981, mailed May 31, 2024, an English Translation attached hereto (7 pages).

* cited by examiner 1
2
2'
3
4'
4"
5
5'
5"
5a
5b
5c
5d
6
60
7
7'
7"
7'"
7a
7a'
7a"
8
8'
8a
8b
9
11
11a
11b
11c
13
15
A
B 1
2
2'
3
4'
4"
5
5'
5"
5a
5b
5c
5d
6
60
7
7'
7"
7'"
7a
7a'
7a"
8
8'
8a
8b
9
11
11a
11b
11c
13
15
A
B 4'
20"
7a'
7'
21
22
62'
62
67
61
63'
65
63
69
60
64
66
66'
67'
5c
5"
15
21
6'
72
6
70
71
C
13
4a
20
20'
F
V
A

ELECTRIC TRACTION AXLE/BEAM

CROSS-REFERENCE TO RELATED APPLICATIONS

This patent application claims priority from Italian patent application no. 102023000021981 filed on Oct. 20, 2023, the entire disclosure of which is incorporated herein by reference.

TECHNICAL SECTOR

This invention relates to a vehicle axle/beam.

The preferred, though not exclusive, application of this invention is an electric traction axle/beam, a so-called "e-axle" or "e-beam". This application will be referred to below by way of example.

PRIOR ART

As known, there is an increasing need to reduce polluting emissions due to internal combustion engines used to operate vehicles, in particular to enable their traction.

This need is even greater for Light Commercial Vehicles (LCV), Medium Commercial Vehicles (MCV), or Heavy Commercial Vehicles (HCV), such as lorries, as well as motor vehicles in general.

To this end, there are known solutions: e-axles or e-beams, i.e. electric traction axles or beams, wherein the axle/beam supports one or more electric machines configured to exchange torque with the drive shafts of the axle and, therefore, with the wheels, to provide or generate power as a function of the vehicle's use.

More specifically, it should be noted that the axle is the component that connects the two wheel hubs that perform a support function only, while a beam is the component that connects the two wheel hubs where there are also drive shafts and the differential assembly and an input point for traction torque.

Examples of these e-axles are illustrated in the patents US2022/0250457 A1, US 2020/0282827 A1 and US2022/0065334 A1.

These solutions involve the use of electric machines in a so-called "on-axis" configuration where, in other words, the axis of the electric machine is coaxial to the axis of the axle/beam drive shafts.

This configuration, though advantageous in terms of assembling the elements directly on the axles themselves, is particularly disadvantageous in terms of the dimensions along this axial direction.

In fact, the positioning of the electric machine, which is particularly bulky, limits the positioning of other functional elements, unless the longitudinal dimension of the axle is increased.

Since it is not always possible, due to the dimensions of components already present on the axle (suspensions, brake system components, frame components, the axle track limit, etc.), to increase this extension, the transmission connecting the electric machine to the wheels or the electric machine itself must be resized, thus actually decreasing the power and performance available to the axle or beam.

Thus, the versatility of torque and power provision over an extended interval, an essential feature for providing an e-axle or e-beam that can be used in diverse vehicle operating conditions, is undermined.

There is, thus, a need to provide e-axles or e-beams that may have reduced dimensions, while maintaining as extended an operational range, in terms of torque and power, as possible to fulfil various vehicle operating conditions.

The purpose of this invention is to meet the needs outlined above in an optimal and inexpensive way.

SUMMARY OF THE INVENTION

The above-mentioned purpose is achieved with an electric traction axle/beam as claimed in the attached claims, which are an integral part of this description.

BRIEF DESCRIPTION OF THE DRAWINGS

For a better understanding of this invention, a preferred embodiment is described below by way of non-limiting example and with reference to the accompanying drawings, wherein.

DETAILED DESCRIPTION OF THE INVENTION

For simplicity, the expression axle/beam or e-axle/e-beam will be used below to avoid repetitions, since the invention can be applied to both architectures.

Figure 1:
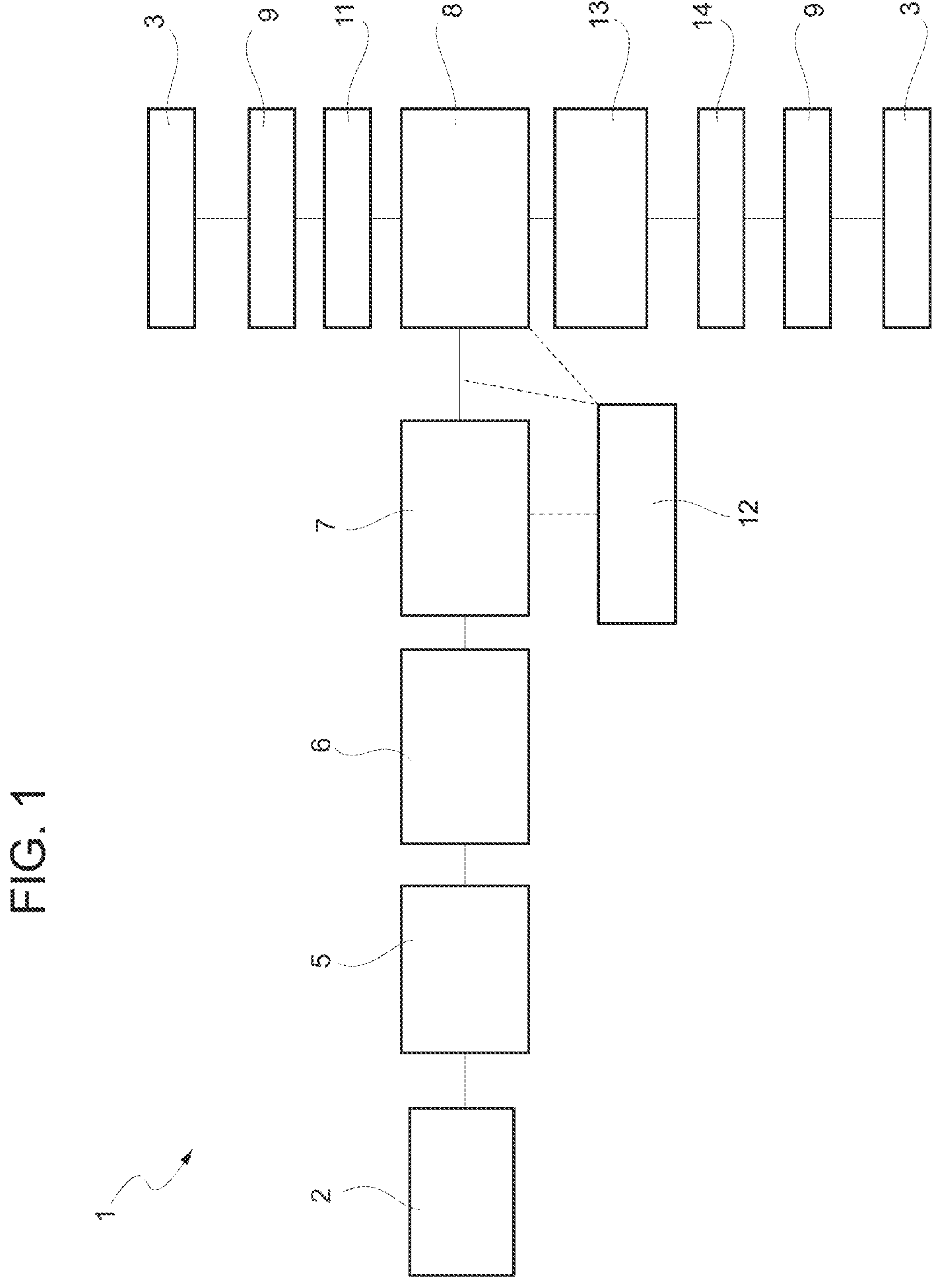
FIG. 1 is a diagram indicating an operational relation between various functional systems of the electric traction axle/beam according to a first embodiment of the invention.

FIG. 1 schematically depicts a transmission chain for exchanging torque in an electric axle/beam 1, or e-axle/e-beam, between an electric machine 2 and a pair of wheels 3 supported by drive shafts 4', 4" of the electric axle 1 according to a first embodiment of the invention.

The electric machine 2, as known, is electrically connected to a power source, such as a battery pack (not illustrated) of the vehicle and is configured to exchange power with this, in particular receiving it to generate torque for the wheels 3 or introducing it into the electric machine, receiving torque from the wheels 3.

As schematically depicted, the transmission chain of the electric axle 1 comprises, in sequence, a first transfer system 5, a second transfer system 7, and a differential assembly 8 between the electric machine 2 and the wheels 3.

Advantageously, there is also a speed ratio shift system 6 between the first transfer system 5 and the second transfer system 7. The term "transfer system" means a system for changing the torque/speed between input and output, which can have a greater, lesser, or equal ratio to either the output or input. Advantageously, the second transfer system 7 is designed as a reducer.

The differential assembly 8 is interposed between the drive shafts 4', 4". Optionally, the latter may be, respectively, connected to the wheels by means of a wheel hub transfer system 9.

Optionally, there may be a differential lock system 11 placed between the differential assembly 8 and one of the drive shafts 4', 4" and, as an additional option, there may be a parking brake system 12 configured to operationally cooperate with either the second transfer system 7 or the differential assembly 8 to lock the movement of the electric axle 1.

Again, optionally, there may be an oil distribution system 13 operationally interposed between the differential assembly 8, one of the drive shafts 4', 4", and the corresponding wheel hub transfer system 9.

Between the wheels 6 and the differential assembly 8, there may also optionally be a disconnection system creating a connection or opening of one of the two drive shafts making vehicle towing possible by actually disconnecting at least one electric machine 2 and the transmission chain upstream of the differential assembly 8.

Figure 2:
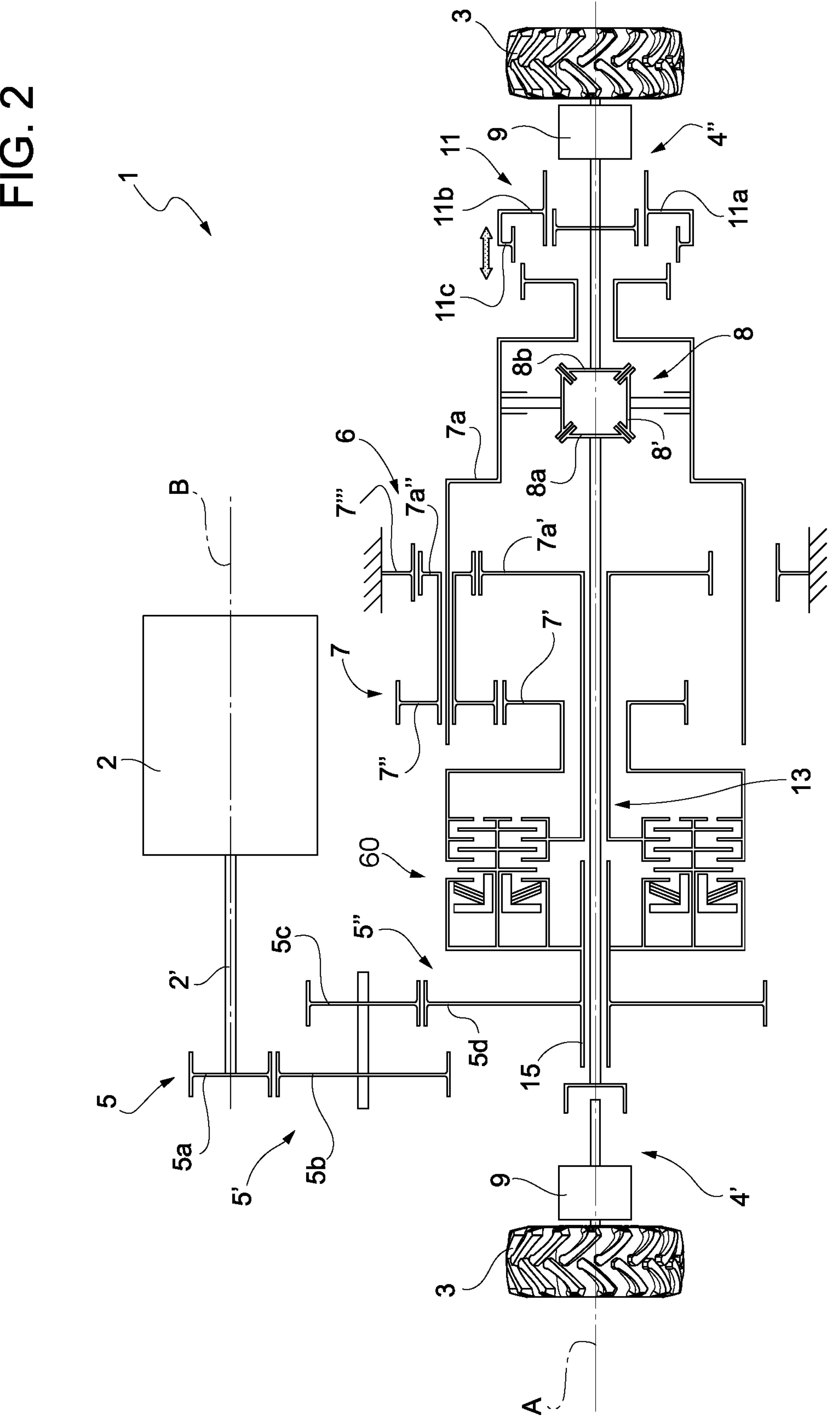
FIG. 2 is a schematic view of an electric traction axle/beam according to a first embodiment of the invention.

With reference to FIG. 2, it should be noted that the axis of an operating shaft 2' of the electric machine 2, i.e. a shaft supported by the electric machine 2 rotor, is coaxial to an axis B that is parallel to and spaced apart from a longitudinal axis A of the axle/beam 1, i.e. coaxial to the drive shafts 4', 4".

This configuration, where the axes A, B are separate and parallel will be defined as "off-axis configuration" below for brevity.

Figure 4:
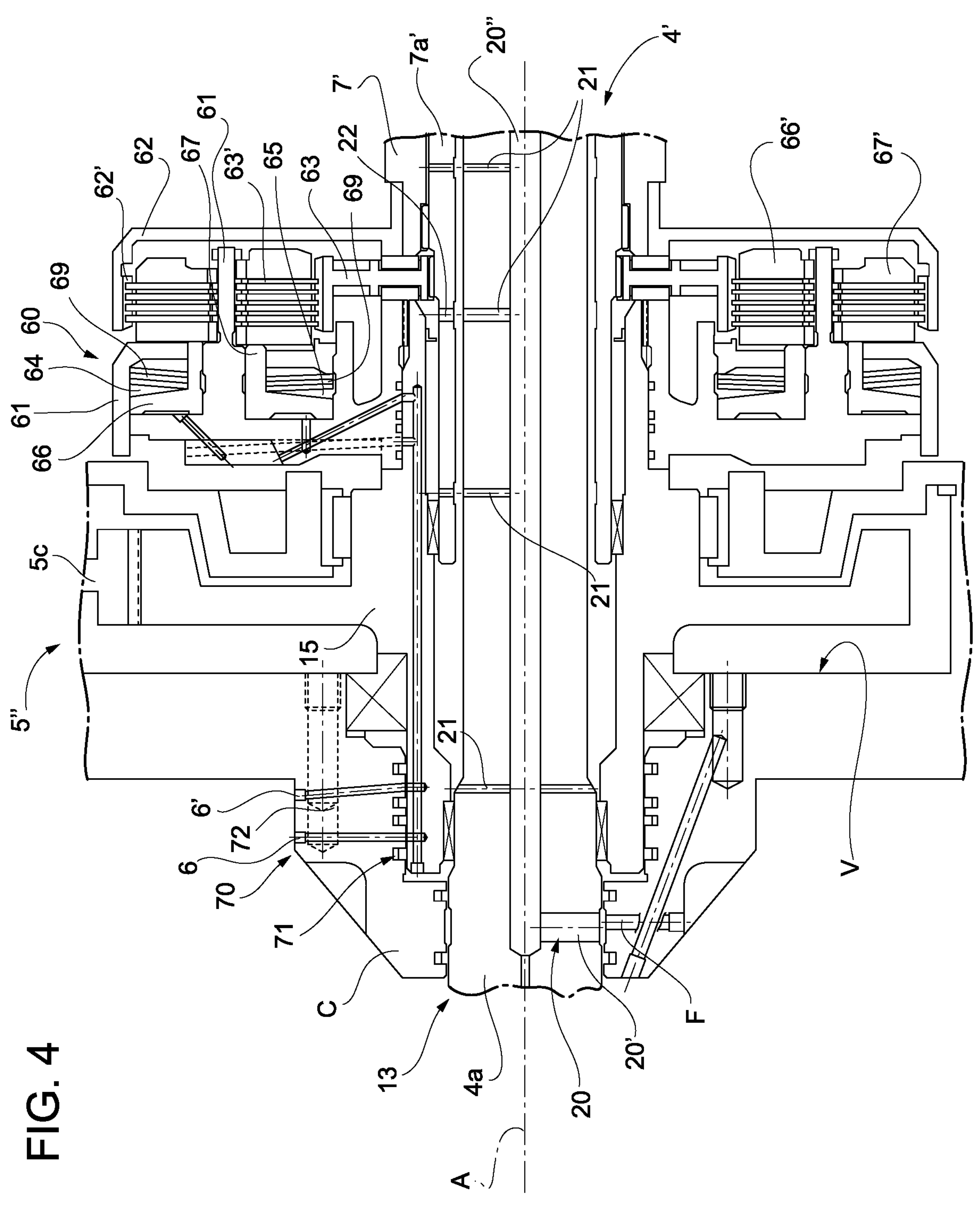
FIG. 4 is a schematic view in cross section of an electrically driven axle according to the first embodiment of the invention.

Although only partially included in FIG. 4, the axle 1 comprises a casing C designed to house the transmission chain described, part of the drive shafts 4', 4", and to support the electric machine 2, in particular its stator. This casing C defines a space V designed to house the elements described below of the transmission chain, insulating them from the outside environment.

The operating shaft 2' of the electric machine 2 is operationally connected by means of the first transfer system 5 to an input shaft 15.

Advantageously, the input shaft 15 is freely rotationally supported with respect to one of the two drive shafts 4', 4"; for simplicity, in this description, reference will be made to the left drive shaft 4' although it is clear that what is described could be reversed, in a mirror-like way, between the left and right drive shaft.

Advantageously, the first transfer system 5 defines at least one transmission ratio between the input shaft 15 and the operating shaft 2' and is, preferably, produced as a parallel shaft transfer system. Specifically, in the embodiment, this transmission ratio is defined by two speed jumps 5', 5" defined by respective gears.

In particular, the transfer system comprises a first gear 5' defined by a first toothed gear 5*a* rigidly supported by the operating shaft 2' and a second toothed gear 5*b* rigidly supported by a support shaft 16 and the second gear 5" comprises a third toothed gear 5*c* rigidly supported by the support shaft 16 and a fourth toothed gear 5*d* rigidly supported by an input shaft 15.

Clearly, though not illustrated, additional gear configurations can be applied such as, for example, a configuration wherein the second toothed gear 5*c* is not included and the first toothed gear 5*a* directly meshes with the second toothed gear 5*b* and 5*b* directly with 5*d*, as, for example, implemented in some embodiments described below.

In this embodiment, the second transfer system 7 is advantageously produced as a compound epicyclic gear, i.e. a first and a second sungear 7', 7*a*', a first and second plurality of satellites 7", 7*a*", and a crown 7''' connected to the casing.

The first and second plurality of satellites 7", 7*a*" mesh with, respectively, the first and second sungear 7', 7*a*' and one of either the first or second plurality of satellites 7", 7*a*" meshes with the crown 7''', in particular the second plurality of satellites 7*a*". The first plurality of satellites 7" is, instead, integral with the rotation with the second plurality of satellites 7*a*", the two pluralities of satellites are, then, supported by the same carrier 7*a*.

As described below, specifically, the speed shift system 6 is configured to connect one of the sungears 7', 7*a*' to the input shaft 15.

The differential assembly 8 is of the type with conical gears and comprises, as known, multiple satellites 8' driven by the carrier 7*a* and meshing with a pair of bevel wheels 8*a*, 8*b* rigidly supported by the left drive shaft 4' and the right drive shaft 4".

The differential lock system 11 is, as known, configured to lock the action of the differential assembly 8, firmly connecting the two drive shafts 4', 4" by connecting one of the two drive shafts 4', 4" with the differential assembly container.

In the embodiment illustrated, the differential lock system 11 basically comprises a sleeve 11*b* supported so as to slide along the axis A from the hub 11*a* and, therefore, from the right drive shaft 4" by means of a connection, such as a grooved one, which can be moved thanks to the action of the actuator means, not illustrated.

The sleeve 11*b* also defines a toothing 11*c* configured to selectively cooperate as a function of its movement along the axis A with a toothing formed on one portion 17 integral with the carrier 7*a*.

The wheel hub transfer system 9, if present, may be produced according to necessity and in different ways and, therefore, is not further described for brevity.

Similarly, the parking brake system 12 can be produced in different forms and on different operating portions of the axle/beam 1 and, therefore, is not further described for brevity.

In particular, the lubrication system 13 is interposed between/integrated with one of the drive shafts 4', 4" and configured to provide lubricating fluid to the reduction systems 5, 7 mentioned above, to the gear change assembly 6, and to the differential assembly 8.

As a result, the lubrication system 13 is interposed between/integrated with the drive shaft 4', 4" surrounded by the reduction systems 5, 7 and gear change assembly 6 thus, in the embodiment described, between the differential assembly 8 and the left drive shaft 4'.

In particular, it should be noted that the left drive shaft 4' comprises a first portion 4*a* and a second shaft portion 4*b* connected to the wheel hub transfer system (if included) rigidly connected between them; in particular the bevel wheel 8*a* is supported by the first portion 4*a*.

Specifically, the lubrication system 13 is integrated into the first portion 4*a*, i.e. interposed in sequence between the differential assembly 8 and the first portion 4*a* of the drive shaft 4'.

Advantageously, the lubrication system comprises at least one lubrication pipe 20 made inside the first portion 4*a*.

Specifically, in the embodiment illustrated, the lubrication pipe 20 comprises a first branch 20' fluidically connected to one (or more) source F of lubricating fluid, for example a fluidic rotary joint made in the casing C and a second branch 20" connected to the first branch 20'.

Specifically, the second branch 20" extends parallel to the axis A, and, thus, coaxially to it, and is open, at one end, at the end of the first portion 4*a* and, thus, inside the differential assembly 8. The first branch 20' instead extends radially, advantageously perpendicularly, to the second branch 20" on the opposite side to the open end to the differential assembly 8.

The lubrication system 20 also comprises a plurality of lubrication branches 21 extending radially starting from the second branch 20" and spaced apart on them along the longitudinal axis A and defining respective lubrication points for the first and second transfer system 5, 7 and the gear change assembly 6.

In other words, the lubrication branches 21 are open and facing the first and second transfer system 5, 7 and the gear change assembly (if present) at one of their first ends, while at the other end, they are connected to the second branch 20".

In the embodiment described, the lubrication branches 21 are made on the same side of the first branch 20' and are all substantially coplanar. In any case, it is clear that they could be made positioned angularly offset circumferentially around the axis A and in a different number to that illustrated.

Advantageously, the second branch 20" or the lubrication branches 21 may comprise calibrated nozzles, for example at their end, configured to better dose and direct the lubricant towards the components that they target.

In particular, it should be noted how these calibrated nozzles may have different sizes and, similarly, the through cross sections of the second branch 20" or of the lubrication branches 21 may have different dimensions or may vary to provide flows of different lubricating fluid to the different elements they face.

In particular, the second branch 20' or the lubrication branches 21 have a through cross section that is, preferably, cylindrical or conical in order to impress even components with an axial force with oil as a function of the centrifugal effects triggered by the rotation of the drive shaft 4'.

Advantageously, the second sungear **7*a*' defines through pipes 22** configured to enable the passage of oil to the parts concerned.

Advantageously, the speed shift system 6 comprises a clutch system 60 configured to selectively connect one of the elements of the second transfer system 7, in particular, in the example described, the two sungears 7', **7*a*', to the input shaft 15**.

Advantageously, the clutch system 60 is an oil bath clutch system and, in particular, but without imposing limits, a multi-disc one.

In the embodiment described, the clutch system 60 may have rotating chambers 61 (FIG. 2) as illustrated in FIG. 4 with construction details or a system with fixed chambers 61 (FIG. 3) connected to the casing and with pistons detached from the rotation by means of corresponding rolling supports.

For brevity, the embodiment in FIGS. 2 and 4 will be described below.

Advantageously, the clutch system 60 comprises a chamber 61 rigidly supported by the input shaft 15 and a first and second connection portion (called, in the jargon, the outer bell and inner hub) 62, 63 rigidly connected, respectively, to the first and second sungear 7', **7*a*'**.

The chamber 61 defines a first and second actuation chamber 64, 65 configured to slidably house a piston 66, 67. Specifically, each actuation chamber 64, 65 houses elastic means 68, 69 inside such as (advantageously) cup springs configured to keep the pistons 66, 67 in a predefined condition as defined below.

The chamber 61 also defines a hub 61' configured to house pressure plates 66', 67' configured to cooperate in contact with discs 62', 63' that are respectively integral with the first and second support elements 62, 63.

Advantageously, the first and second actuation chamber 64, 65 are fluidically separated, like the movement of the pistons 66, 67 and respective pressure plates 66', 67' on the hub 61' and the action of the elastic means 68, 69.

The axle/beam 1 advantageously comprises a hydraulic actuation system 70 to control the clutch system 60. Advantageously, this hydraulic actuation system 70 is integrated into the input shaft 15.

Advantageously, the hydraulic actuation system 70 comprises at least one pair of actuation ducts 71, 72 made inside the input shaft 15 and configured to be fluidically connected, respectively, to the first and second chamber 64, 65.

In particular, the first and second actuation duct 71, 72 are configured to respectively pressurise the first and second chamber 64, 65 by controlling the movement of the piston housed there 66, 67.

Specifically, in the embodiment illustrated, the actuation duct 71, 72 is fluidically connected to two sources G, G', in the embodiment illustrated separately and distinctly, of pressurised operating fluid, for example a fluidic rotary joint made in the casing C.

The operation of the embodiment of the electric traction axle/beam according to the embodiment of the invention described (FIGS. 2 and 4) above is the following.

In a first operating condition, wherein the electric machine 2 acts as an electric motor, it provides torque to the first transfer system 5 that transfers the torque, increasing its value and, therefore, reducing the rotation speed, to the input shaft 15. Depending on the actuation of the specific piston 66, 67 against the discs 62', 63', the torque is transferred from the hub 61' to the first or second sungear 7', **7*a*'. From there, the torque passes to the satellites 7", 7*a*" and, therefore, to the carrier 7*a***.

From this, the torque passes to the differential assembly 8 where, as known, it is divided between the drive shafts 4', 4" and, thus, by means of the wheel hub reduction systems 9 (if included) to the wheels 3, or to them directly.

If not actuated by the fluid passing from the actuation system 70, the elastic means 68, 69 keep the pistons in their rest condition, i.e. in which they do not press the respective counter discs 66', 67' against the discs 62', 63'.

The differential assembly may be locked by means of the differential lock system 11.

In a second operating configuration, wherein the electric machine 2 acts as an electric generator, the torque is provided by the wheels 3 driven by the motion of the vehicle and follows the same transmission chain previously described, in the opposite direction, up to the electric machine 2 that, therefore, generates electricity with the torque received as input.

Figure 3:
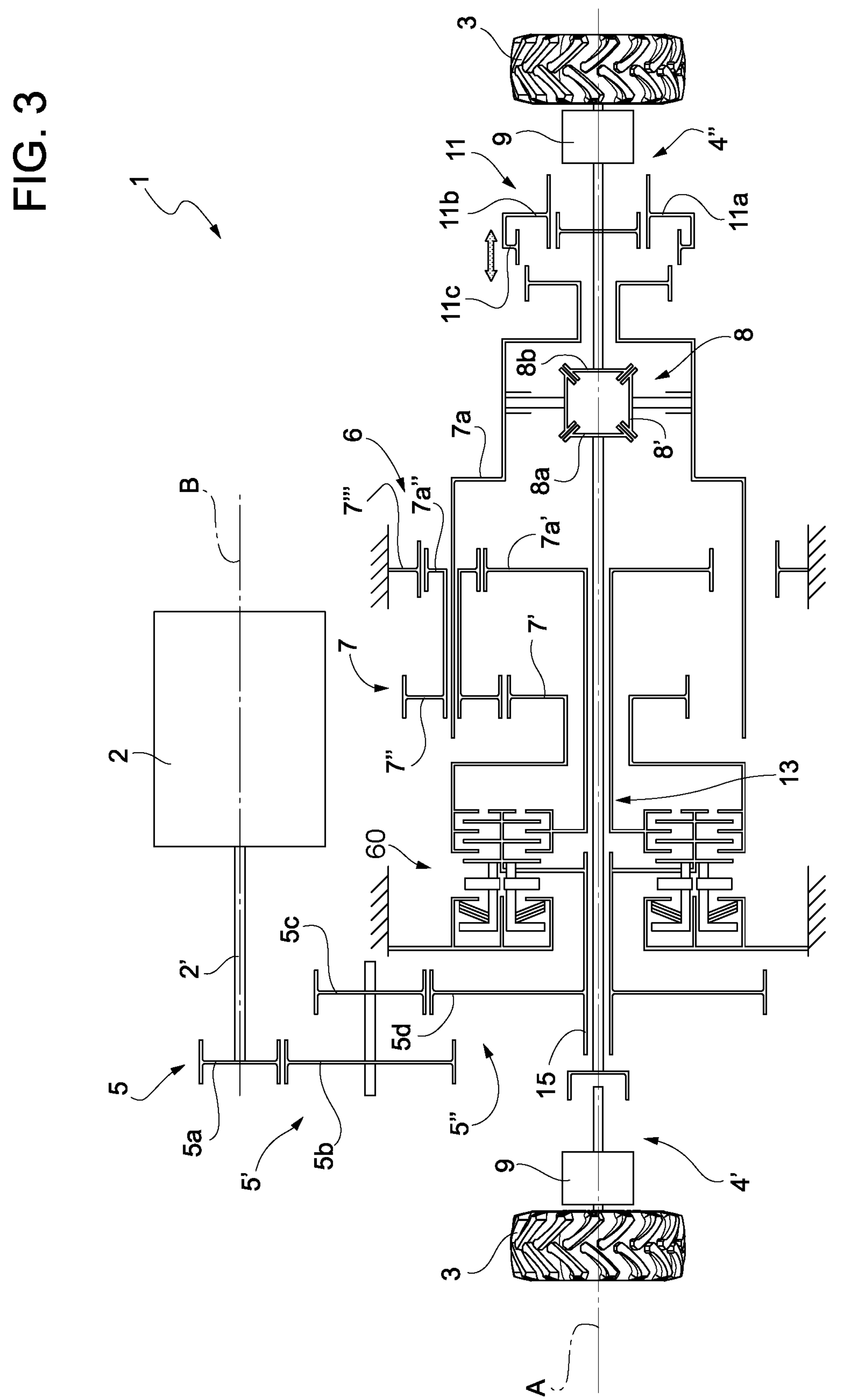
FIG. 3 is a schematic view of an electric traction axle/beam in accordance with a second embodiment of this invention.

The structure and operation of the embodiment in FIG. 3 is similar to the one above, in particular the actuation system is simplified since directly passing through the casing and not the input wheel 15.

From the above, the advantages of an electrically driven axle according to the invention are clear.

Thanks to the axle 1 proposed, it is possible to provide an e-axle/e-beam with reduced longitudinal dimensions while also maintaining a high level of torque/power that can be delivered by the electrified transmission.

Specifically, thanks to the transfer systems proposed, it is possible to provide a high transmission ratio between the electric machine and the wheel hubs in a longitudinally and radially compact way with respect to the axis of the drive shafts.

Again, the off-axis configuration makes it possible to comfortably house the electric machine outside the space V containing the transmission elements, facilitating their assembly and lubrication.

Specifically, the clutch speed shift system makes it possible to obtain, in a compact manner, a very comfortable shift since it is possible to set a power-shifting logic between the pistons, i.e. to enable the coupling of one, while the other is uncoupled, and vice versa, without interrupting the flow of drive torque that reaches the wheels when shifting from one gear to the other.

Thus, the use of two clutch assemblies enables this power-shift torque transfer between one gear and the other, or while always maintaining, with respect to the wheels, a given level of drive torque even during the gear shift manoeuvre. This function is implemented by controlling the two clutches simultaneously with a clutch that closes and one that opens at the same time or, alternatively, the opposite.

The particular arrangement of the pistons and of the actuation chambers coaxially and diametrically one inside the other is also extremely axially compact.

Again, the actuation by means of an actuation system integrated into a shaft of the transmission system is particularly cost-effective since it reduces the need for dedicated pipes.

In particular, thanks to its integration into one of the lubrication system drive shafts, it is possible to provide a system that adapts itself to the rotation speed of the drive shaft, also exploiting the effects of the centrifugal forces that are produced with the rotation.

Again, it is possible to provide multiple lubrication points without complex, bulky piping potentially exposed to damage and breakages.

Thanks to good lubrication, again, it is possible to reduce wear on transmission elements and, therefore, increase their fatigue life, also decreasing losses due to friction and losses due to wasting oil by means of reduced, targeted lubrication thus improving the overall efficiency of the transmission system.

In addition, the lubrication provided is additionally efficient for a clutch speed shift system, sprinkling the discs with enough lubricating fluid during all conditions in which relative speed is created between the conductive discs and conducted discs of the two clutch assemblies.

Lastly, it is clear that modifications and variations may be made to the electrically driven axle manufactured according to this invention, without however departing from the scope of protection defined by the claims.

Clearly, the epicyclic mechanisms described and the differential assembly may be assembled or arranged differently compared to what has been described, as with the other gears and selectors.

Alternatively, the gear change system may be produced with dog clutches, radial ones (with grooves), with clutch elements or with synchroniser elements with respect to what is described above. In particular, dry clutches (insulated from the transmission lubricating fluid) could be used or, advantageously, multi-disc, oil bath ones with "power-shifting" control.

Similarly, actuators and wheel hub transfer systems may be produced differently

In particular, the actuator elements may be produced in various ways, i.e., for example, by means of: pistons, drums, electric actuator linkages, using air or oil, electromagnetic ones, coaxial ones, or remote, rotary, or linear ones, with stable or monostable control, etc.

Again, it is clear that the embodiments illustrated, as far as mechanically compatible, may be combined together.

The invention claimed is:

1. An electrically driven axle, e-axle/e-beam, for a vehicle, the e-axle/e-beam comprising a casing defining a space separated from an external environment and at least one electric machine and a pair of drive shafts each connected to a respective wheel and supported by said casing, said e-axle comprising a transmission chain housed in said space operationally connecting said at least one electric machine to said pair of drive shafts, said transmission chain comprising operationally interposed in series between said at least one electric machine and said pair of drive shafts a first transfer system, a speed shift system and a second transfer system and a differential assembly, wherein the second transfer system has compound-type epicyclic gears, comprising a first sun gear and a second sun gear, wherein said electric machine drives an operating shaft operationally connected by said first transfer system to an input shaft carried in a rotationally free manner by one of said drive shafts and operationally connected to said second transfer system via said speed shift system, said first transfer system defining at least one speed jump between said operating shaft and said input shaft, said speed shift system comprising a clutch shift system, said axle comprising a fluid actuation system for said clutch system, said fluid actuation system being integrated into said input shaft; and a lubrication system for said transmission chain, said lubrication system being interposed in series with one of said drive shafts;

wherein the lubrication system is integrated into a first portion of said one of said drive shafts and includes a first branch and a second branch connected to the first branch, wherein a first end of said second branch is open at an end of the first portion inside the differential assembly;

wherein the lubrication system further includes a plurality of lubrication branches connected to the second branch, wherein the second sun gear includes through passages that are in fluid communication with at least some of the plurality of lubrication branches.

2. The E-axle/E-beam according to claim 1, wherein said clutch shift system comprises a chamber rotatably carried by an element of said first transfer system.

3. The E-axle/E-beam according to claim 2, wherein said chamber is carried by said input shaft.

4. The E-axle/E-beam according to claim 2, wherein said chamber and hub define a first and a second actuation chamber, a first and a second piston housed in a respective of said first and second actuation chambers and a pair of counter discs movable with respect to said hub, said clutch system comprising a first and a second plurality of discs carried by respective support elements carried by respective different elements of said second transfer system, said first and second plurality of discs being connectable by friction to said hub through contact action of said counter discs.

5. The E-axle/E-beam according to claim 4, wherein said fluid actuation system includes a first and a second actuation duct configured to fluidly connect respective sources of operating fluid under pressure in said first and second actuation chambers.

6. The E-axle/E-beam according to claim 4, in which said first and second actuation chambers are fluidly separated from each other.

7. The E-axle/E-beam according to claim 1, wherein said clutch shift system includes a chamber carried fixedly by said casing.

8. The E-axle/E-beam according to claim 1, wherein said speed shift system is configured to allow torque input to said second system transfer through selectively different elements of said second transfer system.

9. The E-axle/E-beam according to claim 8, further comprising a crown connected to the casing and a first and second plurality of satellites meshing between the respective sun gear and said crown and connected by a common carrier, said satellites and connected to each other and insisting on said carrier being operationally connected to said differential assembly, said gear system selectively connecting one of said first and second sun gear to said input shaft.

10. The E-axle/E-beam according to claim 1, in which said differential assembly includes a plurality of satellites driven by said second transfer system and meshing with a first and a second bevel wheel carried by a respective drive shaft.

11. The E-axle according to claim 1, comprising a differential lock system configured to inhibit the function of said differential assembly.

12. The E-axle/E-beam according to claim 1, further comprising wheel hub transfer systems operationally interposed between each wheel and the respective drive shaft.

13. The E-axle/E-beam according to claim 1, further comprising a parking brake system configured to cooperate operationally with at least one of the second transfer system or the differential assembly to block the movement of said E-axle/E-beam.

14. The E-axle/E-beam according to claim 1, comprising a system for disconnection of said drive shafts.

15. A vehicle comprising an E-axle/E-beam according to claim 1.

16. The E-axle according to claim 1, wherein first ends of the plurality of lubrication branches are open to the first and second transfer systems, while second ends of the plurality of lubrication branches are connected to the second branch.

* * * * *